(12) United States Patent
Zhang et al.

(10) Patent No.: US 10,712,013 B2
(45) Date of Patent: Jul. 14, 2020

(54) BIOMASS PELLET STOVE

(71) Applicant: Tanchengxian Hualong MACHINERY PLANT Sole Proprietorship Enterprise, Linyi (CN)

(72) Inventors: Zhicun Zhang, Linyi (CN); Fangwen Cai, Linyi (CN); Hualong Zhang, Linyi (CN); Lechun Zhang, Linyi (CN)

(73) Assignee: TANGCHENGXIAN HUALONG MACHINERY PLANT, Linyi ( * ) Notice: Subject to any disclaimer, the term of this patent is extended or adjusted under 35 U.S.C. 154(b) by 341 days.

(21) Appl. No.: 15/782,827

(22) Filed: Oct. 12, 2017

(65) Prior Publication Data

US 2018/0340690 A1 Nov. 29, 2018

(30) Foreign Application Priority Data

May 26, 2017 (CN) .......................... 2017 1 0382267

(51) Int. Cl.
| | |
|---|---|
| *F24B 13/04* | (2006.01) |
| *F23B 30/00* | (2006.01) |
| *F24B 1/19* | (2006.01) |
| *F23B 50/12* | (2006.01) |
| *F23B 60/02* | (2006.01) |
| *F24B 1/16* | (2006.01) |
| *F24B 1/183* | (2006.01) |

(52) U.S. Cl.
CPC ................ *F24B 13/04* (2013.01); *F23B 1/16* (2013.01); *F23B 50/12* (2013.01); *F23B 60/02* (2013.01); *F24B 1/16* (2013.01); *F24B 1/19* (2013.01); *F23B 2900/00001* (2013.01); *F24B 1/183* (2013.01); *Y02A 40/928* (2018.01)

(58) Field of Classification Search
CPC ........... F24B 13/04; F23B 50/12; F23B 60/02
USPC ............................................................ 126/501
See application file for complete search history.

(56) References Cited

U.S. PATENT DOCUMENTS

| | | | | |
|---|---|---|---|---|
| 5,727,540 | A * | 3/1998 | Eberhardt | F24B 1/1888 126/502 |
| 8,297,271 | B2 * | 10/2012 | Cedar | F23B 20/00 110/188 |
| 2010/0296359 | A1 * | 11/2010 | Velayutham | B28C 7/0076 366/8 |
| 2013/0269678 | A1 * | 10/2013 | Zhu | F24B 13/04 126/501 |
| 2017/0328572 | A1 * | 11/2017 | Wu | F24B 13/04 |

* cited by examiner

*Primary Examiner* — Grant Moubry
*Assistant Examiner* — Aaron H Heyamoto
(74) *Attorney, Agent, or Firm* — Richard A. Castellano; DNL Zito Castellano

(57) ABSTRACT

A stove using biomass pellets as fuels includes a stove body, wherein the stove body comprises a firebox; hopper, wherein the hopper is fixed above the stove body; and feed tube, wherein the top end of the feed tube which is connected to the hopper is fixed outside the stove body, the bottom end of the feed tube which is connected to the firebox crosses the stove body. The stove using biomass pellets as fuels solves the problem that common pellet stoves usually transfer the fuels to the hearth using a screw feeder or other feeding equipment, which expend too much cost.

17 Claims, 11 Drawing Sheets

BIOMASS PELLET STOVE

FOREIGN PRIORITY DATA

This application claims priority from and the benefit of China patent application CN 201710382267.5, filed May 26, 2017, the entire disclosure of which is hereby incorporated by reference herein.

TECHNICAL FIELD

The present disclosure relates to the technical field of a pellet stove, and particularly to a pellet stove that uses biomass pellets as fuels.

BACKGROUND

Pellet stoves that use biomass pellets as fuels can have a large size and heavy weight, may be inconvenient for mobile use after installing, and are usually suitable for indoor use of heating. In addition, they often have complex designs and high manufacturing cost, and may include many electrical components, such as an auger system or other feeding apparatus to feed biomass pellets to a firebox, which limits reliability and raises costs of use and maintenance.

The common pellet stoves usually transfer the fuels to the hearth using screw feeder or other feeding equipment, which expend too much cost. In addition, in the using of the common pellet stoves there are several other problems: for example, the inlet air of traditional furnace is fixed at the side of the furnace, which results in poor burning effect; the insulation of the feed pipe is poor, which results in the temperature of the feed pipe being too high; a feed tube of biomass pellet feed rate is difficult to adjust; and carbide slag is easy to jam after combustion grate, causing the breath to go out.

SUMMARY

First, in order to solve the problem that the common pellet stoves usually transfer the fuels to the hearth using screw feeder or other feeding equipment, which expends too much costs, an embodiment of the disclosure includes a stove, using biomass pellets as fuels, comprising a stove body, wherein the stove body comprises a firebox; a hopper, wherein the hopper is fixed above the stove body; and a feed tube, wherein the top end of the feed tube which is connected to the hopper is fixed outside the stove body, the bottom end of the feed tube which is connected to the firebox crosses the stove body.

In order to solve the problem that the inlet air of traditional furnace is fixed at the side of the furnace, which results in poor burning effect, in accordance with an embodiment of the disclosure, an inlet air is ran through the bottom of the stove body, and an inlet air device is fixed at the inlet air.

In order to adjust the supply air rate, wherein the inlet air device is an inlet air plate, several holes are symmetrically distributed along the center of the air plate, several block sheets which cover the said holes one-to-one are fixed below the air plate, and all the block sheets, which are connected with a first driving lever, connect together.

In order to solve the problem that the feeding rate of the fuels is hard to adjust, an embodiment of the disclosure further comprises a feeding control device which comprises a feeding block and a handle, the feeding block crosses an end of the feed tube which is close to the stove body, the handle which is connected with the feeding block is fixed on an end of the feed tube, which is away from the said stove body.

The function of the handle is as follows: when pushing in the handle to open the feeding block, the feeding of the fuels starts, and the feeding block is opened entirely when the handle is pushed to the end; when pulling out the handle to close the feeding block, the feeding of the fuels reduces gradually, and the feeding block is closed entirely when the handle is pulled out to the end, then no fuels supply and the flame will go out gradually. When the handle is in the pull out position, the stove can be easily handled.

In an embodiment, a flue is fixed at the top of the firebox, and a fire grate which is connected with the stove body is fixed at the bottom of the firebox.

In order to avoid the influence of residue on feeding and air flowing, an embodiment comprises a fine-toothed comb which is fixed at the bottom of the fire grate and contacts with the fire frame in a sliding way, and a second driving lever fixed at the said fine-toothed comb.

In an embodiment, an oven which packs the flue is fixed at the middle part of the hopper, and a baked bar is fixed at the bottom of the oven.

In an embodiment, a slag collection box is fixed below the fire grate.

In order to achieve better burning effects, in an embodiment, a feed tube comprises a vertical tube and a inclined pipe, which are connected to each other, the vertical tube fixed outside of the said stove body, an end of the inclined pipe connected with the bottom of the vertical tube, the other end of the inclined pipe stretching into the firebox.

In order to achieve better burning effects, an embodiment comprises a distance between the bottom of the inclined pipe and the fire grate being in a range of 20 millimeters to 22 millimeters; the included angle between the vertical tube and the inclined pipe is in a range of 134° to 135°.

In order to achieve better insulation effects, an embodiment comprises a thermal baffle which is fixed at the lateral wall of the stove body, a heat-sink wind tunnel formed between the feed tube and the thermal baffle, which both are located outside the stove body, and several heat-sink holes which are connected with the heat-sink wind tunnel are put through the thermal baffle.

In order to achieve better burning, in an embodiment, an air-vent connected with the firebox is put through the sidewall of the stove body.

In an embodiment, a feed tube is set for a couple, which are distributed in the two sides of the said stove body one-to-one; the air-vent is set for a couple, which are symmetrically distributed in the two sides of the stove body; the stove further comprises two cambered dampers which are symmetrically fixed in the firebox, and there is a gap between the top end of the cambered dampers and the top end of the firebox, the bottom of the cambered dampers is close to the above of the fire grate, the two side ends of the cambered dampers is connected with the inside wall of the stove body.

In an embodiment, a plurality of through-holes are provided in a upper part of the cambered dampers.

In an embodiment, a bending portion is formed by bending a top end and a bottom end of the cambered dampers toward far away from the stove body.

In order to adjust the capacity of the hopper, in an embodiment, an overhead guard is fixed by sliding connection with the inside wall of the hopper, the overhead guard is limited connected with the hopper by a limiting bolt.

}

In an embodiment, a furnace door with an inspection window is fixed at the front side of the stove body.

In an embodiment, a heat-sink chassis with several air holes is fixed at the bottom of the stove body; and a folding leg is fixed at the bottom of the heat-sink chassis.

In an embodiment, a guard bar surrounds and is fixed at the sidewall of the stove body.

In an embodiment, a water tank is fixed at the backside of the stove body.

The above technical solutions have the below features:

1. The stove has a simple structure and removes any mechanically or electrically controlled feeding system by feeding the firebox using gravity of the fuels, therefore lowering the cost.

2. Setting a pair of cambered dampers and a pair of air-vents to force air to move in two ways, one way is along the cambered dampers to move upward, thus blowing flue gas particles to settle down; and another way is along the cambered dampers to move downward, thus improving the combustion effect of the biomass particles. Meanwhile, the air upward from the air holes at the bottom of the stove body mixes with the air delivered from the cambered dampers to the bottom, and the two kinds of air produce convection, so as to further promote the separation of particles in flue gas.

3. A plurality of through-holes are provided in the cambered dampers so that the air delivered upward along the cambered dampers passes through the through-holes and blows to the flue gas generated by combustion, and settles the particles in the flue gas to the bottom. A bending portion is formed on the cambered dampers such that the air can be transported to a wider range as much as possible.

DETAILED DESCRIPTION

Embodiment 1

Figure 1:
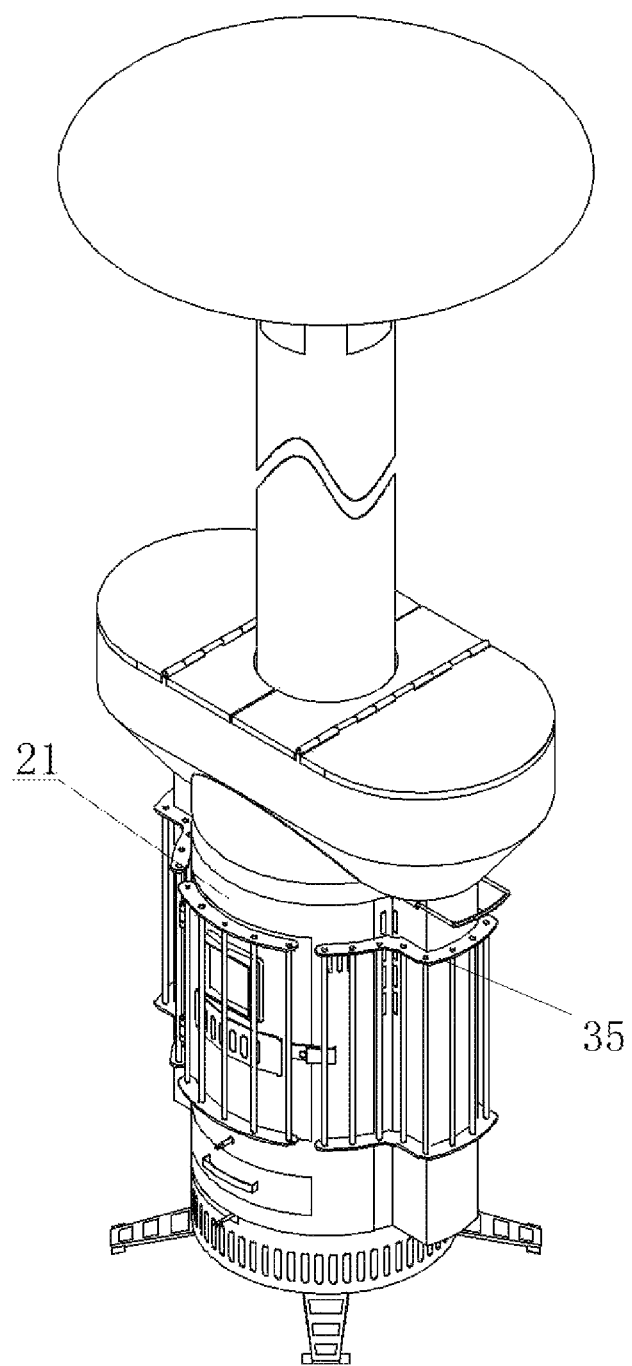
FIG. 1 is the stereogram of the stove of the invention.
Figure 2:
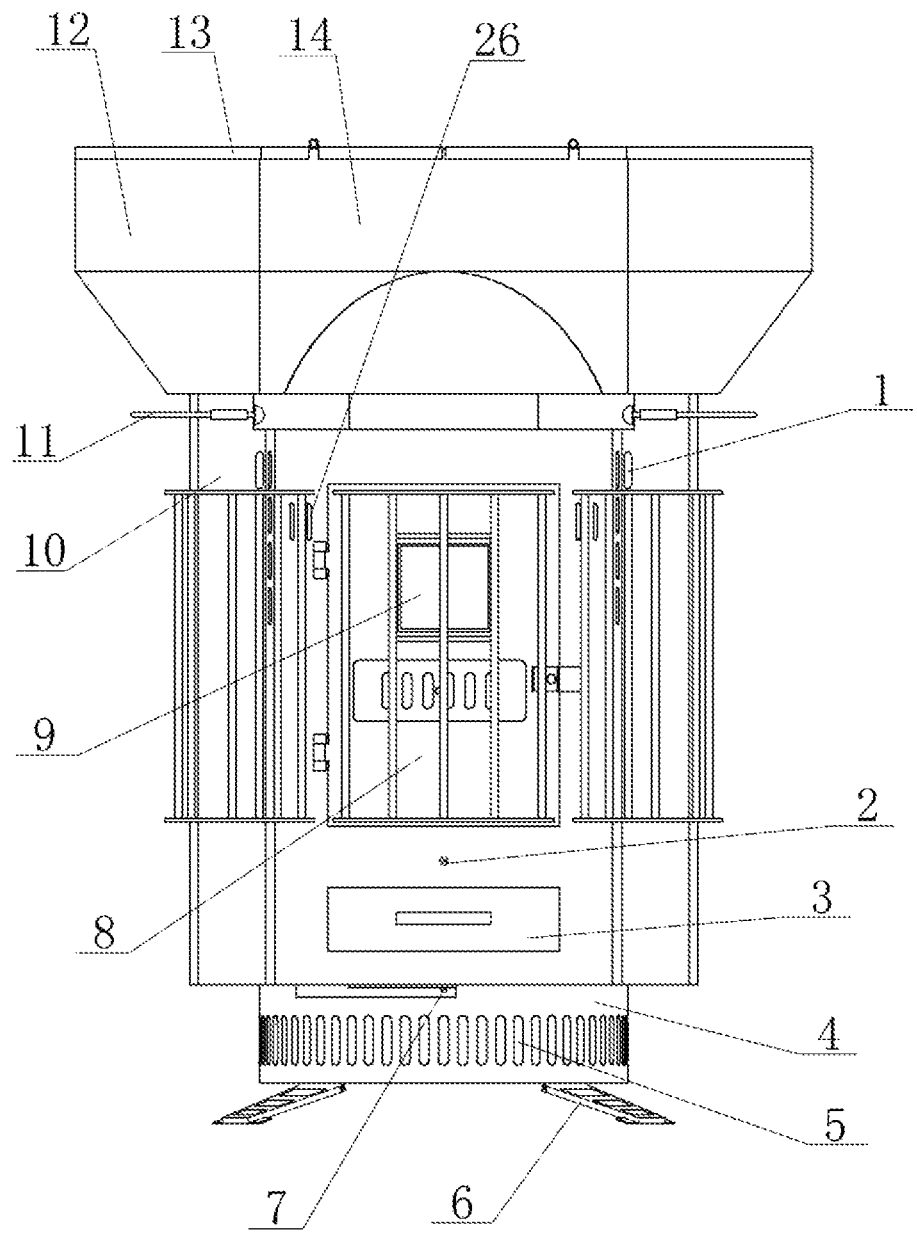
FIG. 2 is the front view of the stove body.
Figure 3:
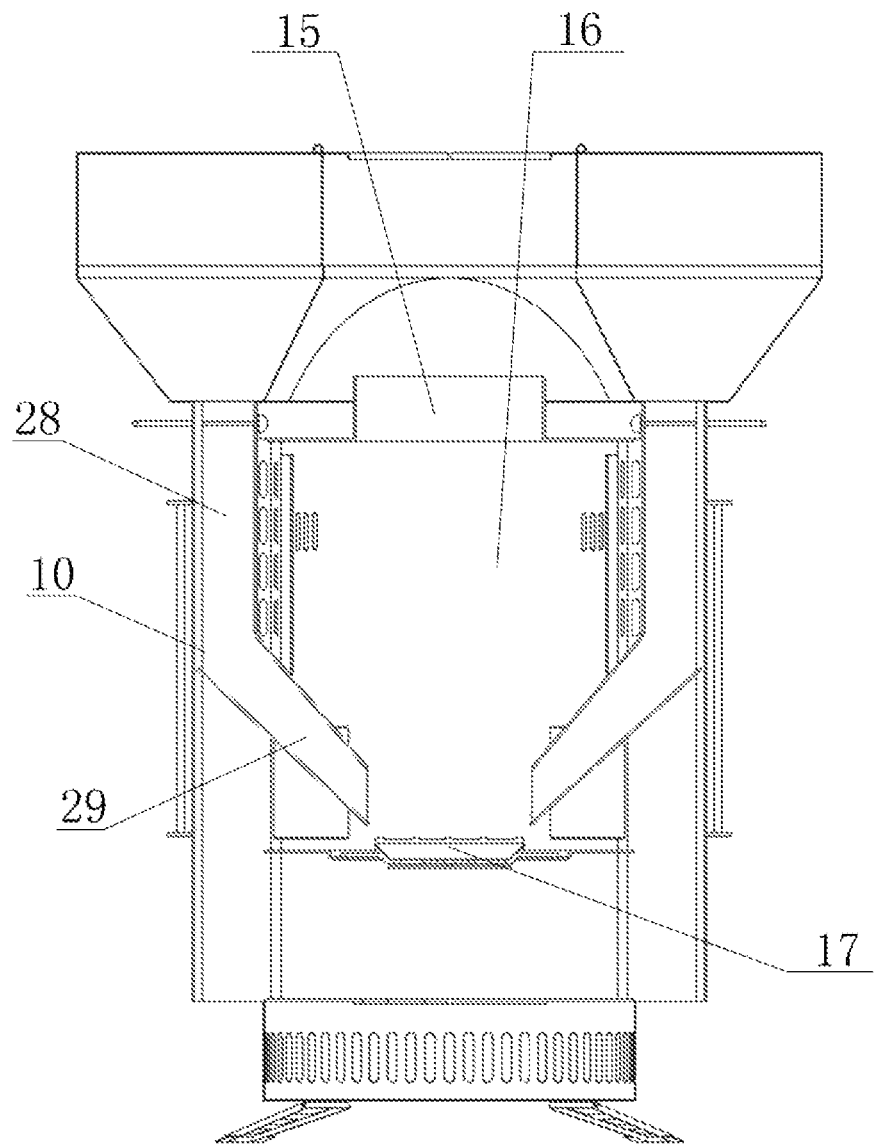
FIG. 3 is the section view of FIG. 2.
Figure 4:
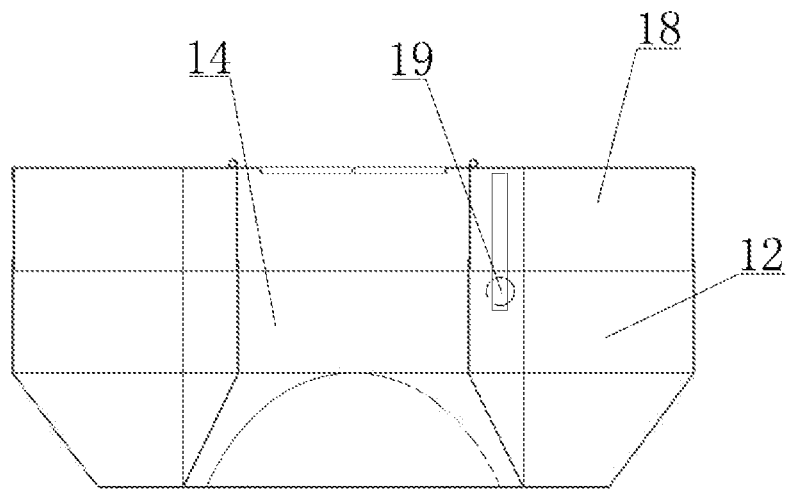
FIG. 4 is the structure schematic diagram of the hopper.
Figure 5:
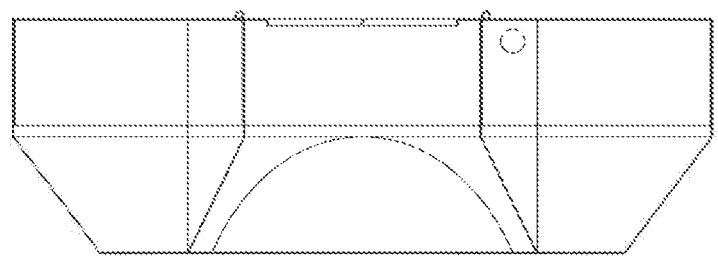
FIG. 5 is the diagram of the change state of FIG. 4.
Figure 6:
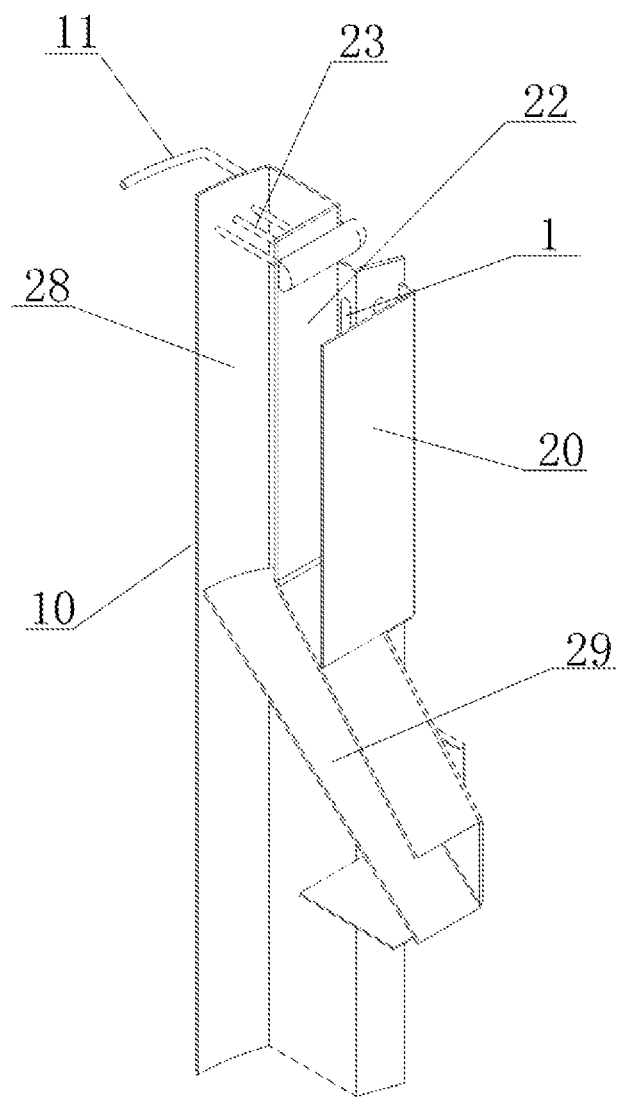
FIG. 6 is the structure schematic diagram of the feed tube.
Figure 7:
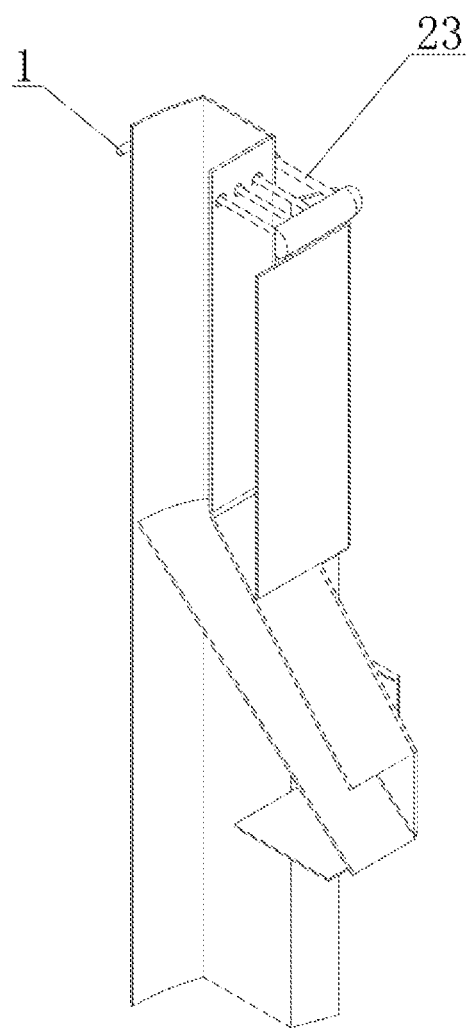
FIG. 7 is the diagram of the change state of FIG. 6.
Figure 8:
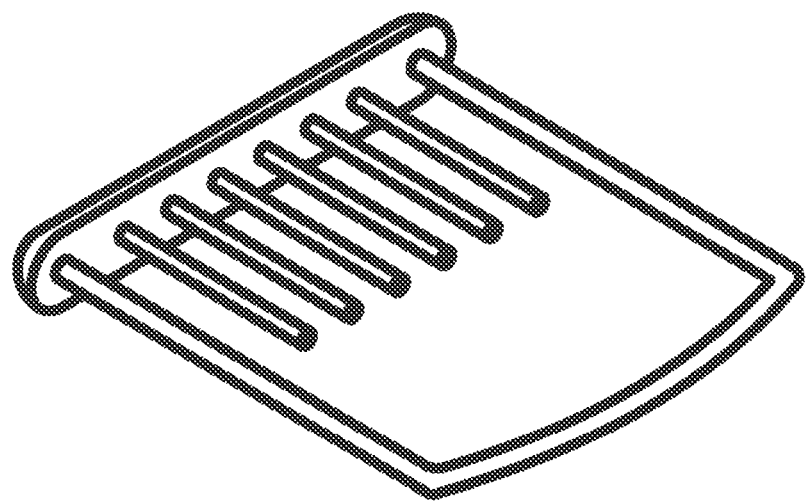
FIG. 8 is the structure schematic diagram of the feeding block and the handle.
Figure 9:
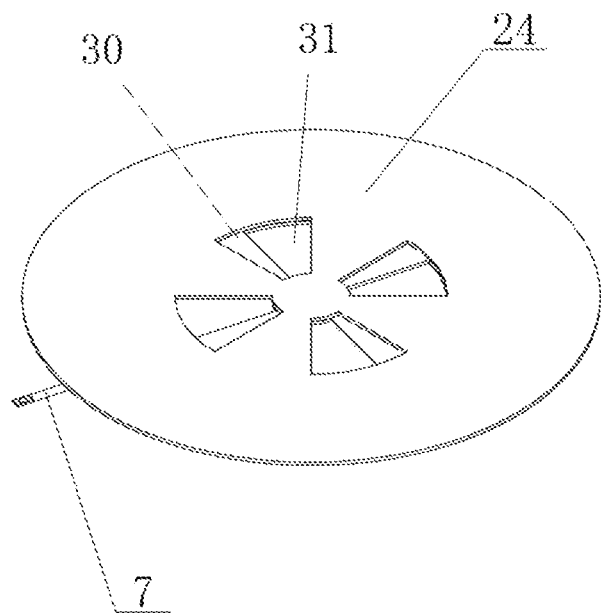
FIG. 9 is the structure schematic stereogram of the air plate.
Figure 10:
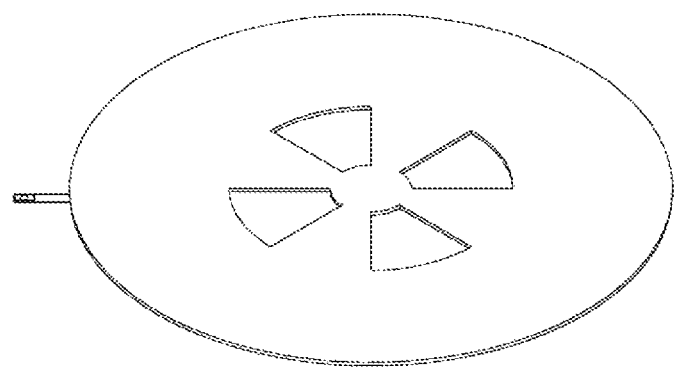
FIG. 10 is the diagram of change state of FIG. 9.
Figure 11:
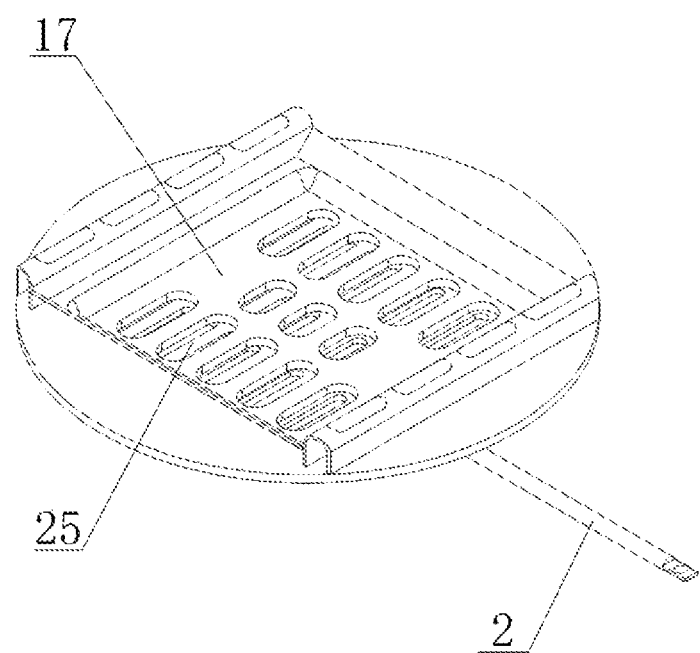
FIG. 11 is the stereogram of the fire grate.
Figure 12:
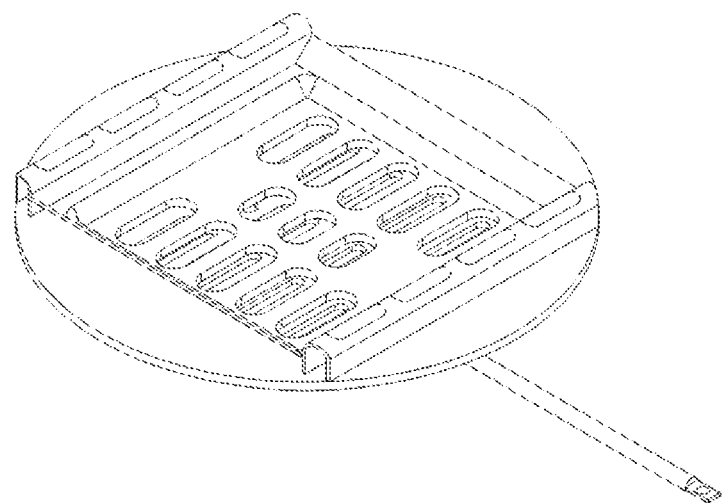
FIG. 12 is the diagram of change state of FIG. 11.
Figure 13:
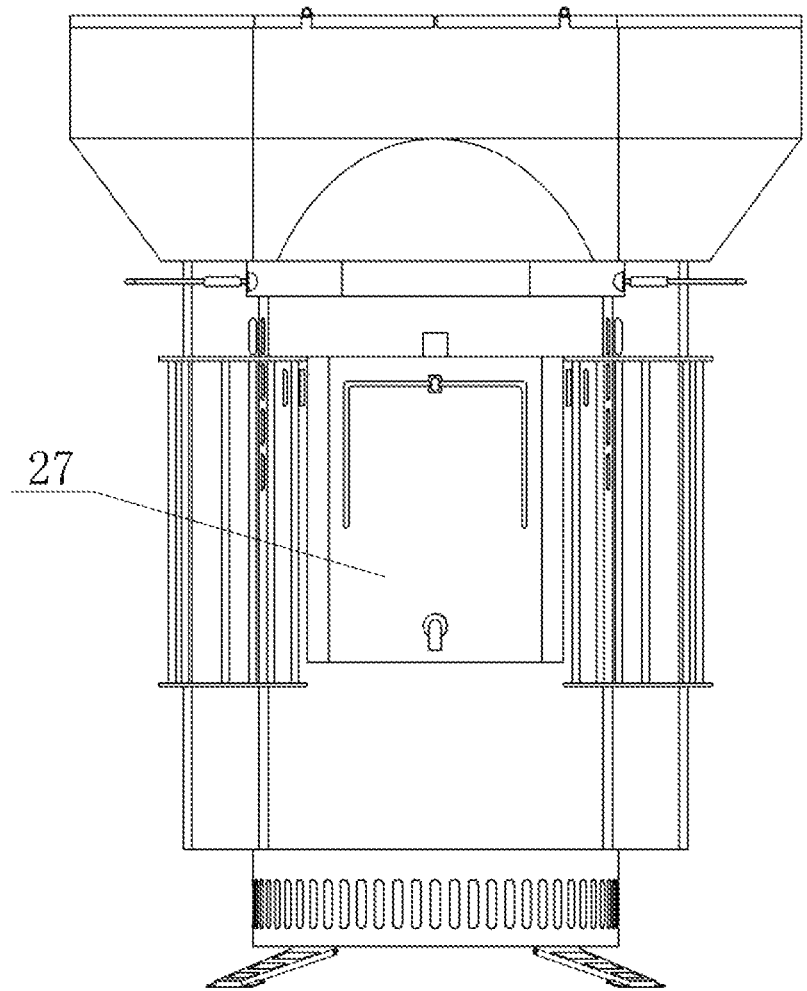
FIG. 13 is the back view of the stove.
Figure 14:
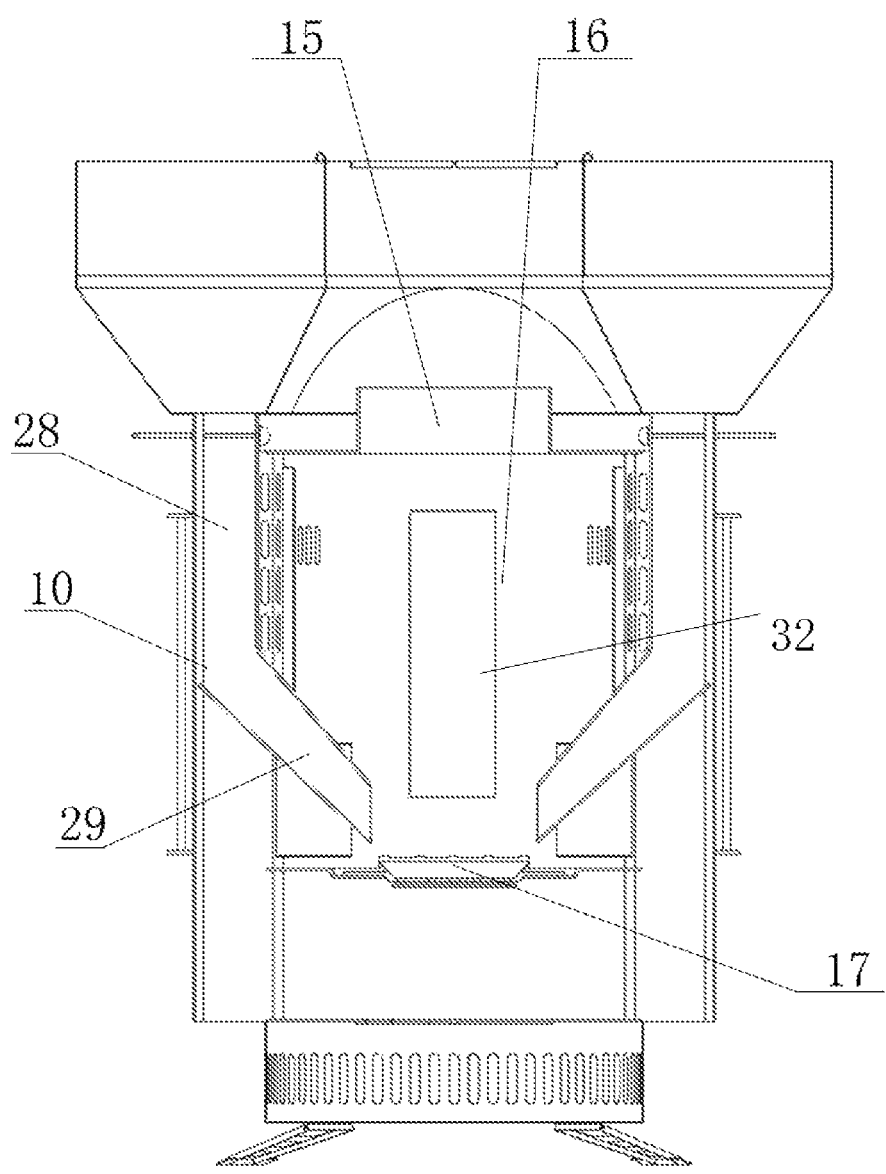
FIG. 14 is the diagram of the stove body according to another embodiment.
Figure 15:
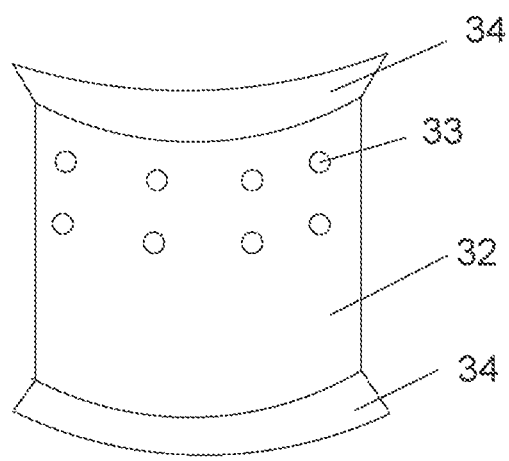
FIG. 15 is the diagram of the cambered damper in FIG. 14.

Seen in FIG. 1-FIG. 12, a stove using biomass pellets as fuels, comprises: a stove body 21, wherein the stove body 21 comprises a firebox 16; a hopper 12, wherein the hopper 12 is fixed above the stove body 21; and a feed tube 10, wherein the top end of the feed tube 10 which is connected to the hopper 12 is fixed outside the stove body 21, the bottom end of the feed tube 10 which is connected to the firebox 16 crosses the stove body 21; an inlet air is ran through the bottom of stove body 21, and an inlet air device is fixed at the inlet air.

In order to adjust the supply air rate, wherein the inlet air device is an inlet air plate 24, several or a plurality of holes 30 are symmetrically distributed along the center of the said air plate 24, several block sheets 31 which cover the holes 30 one-to-one are fixed below the said air plate 24, and all the said block sheets 31 which are connected with a first driving lever 7 connect together.

In order to solve the problem that the feeding rate of the fuels is hard to adjust, an embodiment further comprises a feeding control device which comprises a feeding block 23 and a handle 11, the feeding block 23 crosses an end of the feed tube 10, which is close to the stove body 21, the handle 11, which is connected with the feeding block 23 is fixed on an end of the feed tube 10, which is away from the said stove body 21.

In an embodiment, a flue 15 is fixed at the top of the said firebox 16, a fire grate 17 which is connected with the stove body 21 is fixed at the bottom of the firebox 16.

In order to avoid the influence of residue on feeding and air flowing, in an embodiment, a fine-toothed comb 25 is fixed at the bottom of the fire grate 17 and contacts with the fire frame in a sliding way, and a second driving lever 2 is fixed at the fine-toothed comb 25.

In an embodiment, an oven 14 that packs the flue 15 is fixed at the middle part of the hopper 12, and a baked bar is fixed at the bottom of the said oven 14.

In an embodiment, a slag collection box is fixed below the said fire grate 17.

In order to achieve better burning effects, in an embodiment, the feed tube 10 comprises a vertical tube 28 and an inclined pipe 29 which are connected to each other, the vertical tube 28 is fixed outside of the stove body 21, an end of the inclined pipe 29 is connected with the bottom of the vertical tube 28, the other end of the said inclined pipe 29 stretches into the firebox 16.

In order to achieve better burning effects, in an embodiment, a distance between the bottom of the inclined pipe 29 and the fire grate 17 is in a range of 20 mm to 22 mm; and the included angle between the vertical tube 28 and the inclined pipe 29 is in a range of 134°-135°.

In order to achieve better insulation effects, an embodiment comprises a thermal baffle 20 fixed at the lateral wall of the stove body 21, a heat-sink wind tunnel 22 is formed between the feed tube 10 and the thermal baffle 20, which both are located outside the stove body 21, several heat-sink holes 1 connected with the heat-sink wind tunnel 22 are put through the thermal baffle 20.

In order to achieve better burning, in an embodiment, an air-vent 26 connected with the firebox 16 is put through the sidewall of the stove body 21.

In order to adjust a capacity of the hopper, an overhead guard 18 is fixed by sliding connection with the inside wall of the said hopper 12; the overhead guard 18 is limited connected with the hopper 12 by a limiting bolt 19.

In an embodiment, a furnace door with an inspection window is fixed at the front side of the stove body 21.

In an embodiment, a heat-sink chassis 5 with several air holes is fixed at the bottom of the stove body 21; a folding leg 6 is fixed at the bottom of the heat-sink chassis 5.

In an embodiment, a guard bar 35 surrounds and is fixed at the sidewall of the stove body 21.

In an embodiment, a water tank is fixed at the backside of the stove body 21.

Embodiment 2

Compared with embodiment 1, embodiment 2 has the following improvement: the said feed tube 10 is set for a couple, which are distributed in the two sides of the stove body 21 one-to-one; the air-vent 26 is set for a couple, which are symmetrically distributed along the vertical section which is symmetrically distributed in two sides of the stove body; the stove further comprises two cambered dampers 32 which are symmetrically fixed in the firebox 16, and there is a gap between the top end of the cambered dampers 32 and the top end of the firebox 16, the bottom of the cambered dampers 32 is close to the above of the fire grate 17, the two side ends of the cambered dampers 32 are connected with the inside wall of the said stove body 21.

Setting a pair of cambered dampers and a pair of air-vents to force air to move in two ways, one way is along the cambered dampers to move upward, thus blowing flue gas particles to settle down; and another way is along the cambered dampers to move downward, thus improving the combustion effect of the biomass particles. Meanwhile, the air upward from the air holes at the bottom of the stove body mixes with the air delivered from the cambered dampers to the bottom, and the two kinds of air produce convection, so as to further promote the separation of particles in flue gas.

In an embodiment, a plurality of through-holes 33 are provided in the upper part of the cambered dampers 32.

In an embodiment, a bending portion 34 is formed by bending a top end and a bottom end of the cambered dampers toward far away from the stove body 21.

A plurality of through-holes are provided in the cambered dampers so that the air delivered upward along the cambered dampers passes through the through-holes and blows to the flue gas generated by combustion, and settles the particles in the flue gas to the bottom. A bending portion is formed on the cambered dampers such that the air can be transported to a wider range as much as possible.

The invention claimed is:

1. A stove useful for consuming biomass pellets as fuel, comprising:
    a stove body comprising a firebox, a top, a bottom, an exterior, and an interior;
    a hopper fixed at the a top of the stove body; and
    a feed tube comprising:
        a first end connected to the hopper and extending vertically along the exterior of the stove body toward the bottom of the stove body to a second end extending into an interior of the stove body,
        a vertical tube at the first end; and
        an inclined pipe at the second end and connected to the vertical tube, the vertical tube fixed outside the stove body, an end of the inclined pipe connected with the bottom of the vertical tube, the other end of the said inclined pipe stretching into the firebox
    a flue fixed at a top of the firebox; and
    a fire grate connected with the stove body and fixed at the bottom of the firebox, wherein a distance between the bottom of the inclined pipe and the fire grate is in a range of 20 mm to 22 mm; and an included angle between the vertical tube and the inclined pipe is in a range of 134° to 135°.

2. The stove of claim 1, comprising an inlet air device configured to receive inlet air through a bottom of the stove body.

3. The stove of claim 2, the inlet air device further comprising:
    an inlet air plate;
    a plurality of holes symmetrically distributed along the center of a same axis of the inlet air plate;
    a plurality of block sheets which cover the plurality of holes one-to-one are fixed below the inlet air plate, and all the block sheets connect together; and
    a first driving lever connected to the block sheets.

4. The stove of claim 1, comprising:
    a feeding control device comprising a feeding block and a handle, wherein the feeding block extends through across-section of the feeding tube from a first side thereof distal to the stove body to a second side thereof proximal to the stove the handle connected with the feeding block and fixed on an end of the feed tube, which is away from the stove body.

5. The stove of claim 1, wherein the driving lever is a first driving lever, the stove comprising:
    a fine-toothed comb fixed at a bottom of the fire grate which are slidingly joined to each other; and
    a second driving lever fixed at the fine-toothed comb.

6. The stove of claim 1, comprising an oven, which packs the flue and is fixed at the middle part of the hopper, and a baked bar fixed at the bottom of the oven.

7. The stove of claim 1, comprising a slag collection box fixed below the fire grate.

8. The stove of claim 1, comprising:
    a thermal baffle fixed at a lateral wall of the stove body;
    a heat-sink wind tunnel formed between the feed tube and the thermal baffle; and
    a plurality of heat-sink holes defined by the thermal baffle and that communicate with the heat-sink wind tunnel.

9. The stove of claim 8, comprising:
    an air-vent provided in a sidewall of the stove body and communicating with the firebox.

10. The stove of claim 9, wherein the feed tube is a first feed tube, the stove comprising:
    a second feed tube, the first feed tube and the second feed tube distributed in two sides of the stove body one-to-one; a pair of air-vents symmetrically distributed in two sides of the stove body, the stove further comprising two cambered dampers symmetrically fixed in the firebox; wherein a top end of the cambered dampers and a top of the firebox define a gap, wherein a bottom of the cambered dampers is above of the fire grate, and two side ends of the cambered dampers are connected with the inside wall of the stove body.

11. The stove of claim 1, comprising an overhead guard fixed by a sliding connection with the inside wall of the hopper; the overhead guard limited connected with the hopper by a limiting bolt.

12. The stove of claim 1, comprising a furnace door with an inspection window fixed at a front side of the stove body.

13. The stove of claim 1, comprising a heat-sink chassis defining a plurality of air holes, the heat-sink chassis fixed at the bottom of the stove body and comprising a folding leg fixed at the bottom of the heat-sink chassis.

14. The stove of claim 1, comprising a guard bar fixed at the sidewall of the stove body.

15. The stove of claim 1, comprising a water tank fixed at the backside of the stove body.

16. A stove useful for consuming biomass pellets as fuel, comprising:
    a stove body comprising a firebox, a top, a bottom, an exterior, and an interior;
    a hopper fixed at the a top of the stove body; and a first feed tube comprising:
- a first end connected to the hopper and extending vertically along the exterior of the stove body toward the bottom of the stove body to a second end at an interior of the stove body,
- a vertical tube at the first end, and
- an inclined pipe at the second end and connected to the vertical tube, the vertical tube fixed outside the stove body, an end of the inclined pipe connected with the bottom of the vertical tube, the other end of the said inclined pipe stretching into the firebox a flue fixed at a top of the firebox; and
a fire grate connected with the stove body and fixed at the bottom of the firebox,
the stove further comprising two cambered dampers symmetrically fixed in the firebox, wherein
a plurality of through-holes are provided in a top end of the cambered dampers, a second feed tube, the first feed tube and the second feed tube distributed in two sides of the stove body one-to-one; of air-vents symmetrically distributed in two sides of the stove body, wherein the top end of the cambered dampers and a top of the firebox define a gap, wherein a bottom of the cambered dampers is-above of the fire grate, and two side ends of the cambered dampers are connected with the inside wall of the stove body,
a thermal baffle which is fixed at a lateral wall of the stove body;
a heat-sink wind tunnel formed between the feed tube and the thermal baffle; and
a plurality of heat-sink holes defined by the thermal baffle that communicate connected with the heat-sink wind tunnel.

17. A stove useful for consuming biomass pellets as fuel, comprising:
- a stove body comprising a firebox, a top, a bottom, an exterior, and an interior;
- a hopper fixed at the a top of the stove body; and
- a first feed tube comprising:
  - a first end connected to the hopper and extending vertically along the exterior of the stove body toward the bottom of the stove body to a second end at an interior of the stove body,
  - a vertical tube at the first end, and
  - an inclined pipe at the second end and connected to the vertical tube, the vertical tube fixed outside the stove body, an end of the inclined pipe connected with the bottom of the vertical tube, the other end of the said inclined pipe stretching into the firebox a flue fixed at a top of the firebox; and
a fire grate connected with the stove body and fixed at the bottom of the firebox,
the stove further comprising two cambered dampers symmetrically fixed in the firebox, wherein
a plurality of through-holes are provided in a top end of the cambered dampers, a second feed tube, the first feed tube and the second feed tube distributed in two sides of the stove body one-to-one; of air-vents symmetrically distributed in two sides of the stove body, wherein the top end of the cambered dampers and a top of the firebox define a gap, wherein a bottom of the cambered dampers is-above of the fire grate, and two side ends of the cambered dampers are connected with the inside wall of the stove body,
a thermal baffle which is fixed at a lateral wall of the stove body;
a heat-sink wind tunnel formed between the feed tube and the thermal baffle; and
a bending plate formed by bending toward the top end and the bottom of the cambered dampers.

* * * * *